ns Patent Office 2,794,794
Patented June 4, 1957

2,794,794

LINEAR SUPERPOLYESTERS FROM TERTIARY-BUTYL ISOPHTHALIC ACID

Maurice J. Schlatter, Kensington, and Judson C. Butler, El Cerrito, Calif., assignors to California Research Corporation, San Francisco, Calif., a corporation of Delaware No Drawing. Application October 29, 1953, Serial No. 389,181

2 Claims. (Cl. 260—75)

This invention relates to a novel class of linear superpolyesters possessing improved physical properties.

We have discovered a novel class of linear superpolyesters of 5-t-butyl-isophthalic acid and glycols of 2 to 10 carbon atoms which are distinguished by greatly improved heat resistance compared to polyesters of ordinary isophthalic acid.

These novel linear superpolyesters may also be illustrated as possessing recurring units of the structural formula

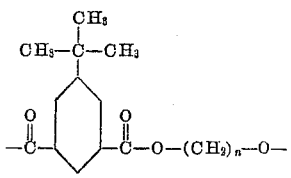

in which $n$ is 2 to 10.

The higher heat resistance of the novel superpolyesters according to this invention makes them more suitable than ordinary isophthalic acid superpolyesters for the production of films, molded articles and fibers. This very desirable improvement in heat resistance may be attributed to the unique molecular structure of the superpolymers of the invention as illustrated by the above formula.

Although the molecular chains of the present polymers are substituted by a bulky tertiary butyl group, they are found to have higher heat distortion points and to yield fibers. This is entirely unexpected since a recent article entitled The development of terylene appearing in the Textile Research Journal for May 1953, page 289, has stated that if the molecular chain was disturbed "by the presence of bulky side-groups . . . the resulting polymers were noncrystalline and did not yield fibers."

The tertiary butyl groups which are a novel feature of the present superpolymers are also greatly desired for the improved dyeability, moisture retentivity, and flexural impact strengths they impart to synthetic plastic compositions.

Pursuant to the present invention, 5-t-butyl-isophthalic acid is condensed with a glycol of 2 to 10 carbon atoms to produce a high polymer. The condensation may be accomplished by heating the 5-t-butyl-isophthalic acid and glycol in a reaction vessel from which the water formed in the condensation reaction is removed by distillation.

The 5-t-butyl-isophthalic acid may be employed as such in the reaction or esters such as dimethyl 5-t-butyl-isophthalate may be used. In the latter case, ester interchange catalysts such as litharge, zinc, zinc borate and the like may be used in effecting the condensation.

The 5-t-butyl-isophthalic acid may be conveniently and economically prepared by the oxidation of 5-t-butyl meta-xylene derived by tertiary butylation of meta-xylene.

The aliphatic glycols of 2 to 10 carbon atoms may also be described as polymethylene glycols of 2 to 10 carbon atoms. They may be represented by the following structural formula $$HO-(CH_2)_n-OH$$

in which $n$ is 2 to 10. Glycols of 2 to 4 methylene groups are presently preferred since they produce the polyesters of highest melting points. Of these glycols, ethylene glycol is most preferred because of its ready availability and reasonable cost.

The following examples are submitted in the illustration of the invention. The proportions, unless otherwise specified, are on a weight basis.

Example 30.0 grams of 5-t-butyl-isophthalic acid and 29.2 grams of ethylene glycol were placed in a glass reaction flask with 0.02 gram of calcium oxide catalyst. The flask was placed in a bath and heated to about 464° F. under refluxing conditions for approximately two hours. At the end of this period, the liquid contents of the flask were clear. A vacuum equivalent to 2 to 3 millimeters of mercury pressure was applied. The flask was then heated to about 500° F. and maintained at that temperature for about 18½ hours to give highly polymeric linear ethylene 5-t-butyl-isophthalate.

The superpolyester of 5-t-butyl-isophthalic acid and ethylene glycol prepared above was a hard, tough resin at room temperature and possessed a melting point of approximately 230° F. It was unusually heat resistant and had a heat distortion point of about 170° F. Excellent fibers could be drawn from the resin which, upon immersion in hot water, did not begin to soften until a temperature of about 185° F. was reached.

For the purpose of comparison, a superpolyester of ethylene glycol and ordinary isophthalic acid was prepared according to the procedure of the above example. A resinous composition was thus obtained which melted at about 221° F. It had a heat distortion point of only about 140° F. by ASTM Method D648–45T. Fibers of the material, when immersed in hot water, could not stand temperatures above 158° F. without becoming soft.

The superior heat resistant properties of the linear superpolyesters of 5-t-butyl-isophthalic acid and aliphatic glycol of 2 to 10 carbon atoms according to this invention are readily apparent from the above comparison. The present high polymers are characterized by much higher heat distortion points and softening points and resistance to boiling water than the corresponding polymers of ordinary isophthalic acid. These desirable properties are totally unanticipated by the prior art.

We claim:

1. A linear superpolyester of 5-t-butyl-isophthalic acid and a glycol of 2 to 10 carbon atoms.

2. A linear high polymer of ethylene 5-t-butyl-isophthalate.

References Cited in the file of this patent

UNITED STATES PATENTS 2,623,034     Flory et al. _____ Dec. 23, 1952

OTHER REFERENCES

Chem. Abs., 1942, p. 5786 (5).